Feb. 6, 1951  O. JACOBSEN  2,540,371
DIAPHRAGM VALVE
Original Filed Jan. 27, 1944
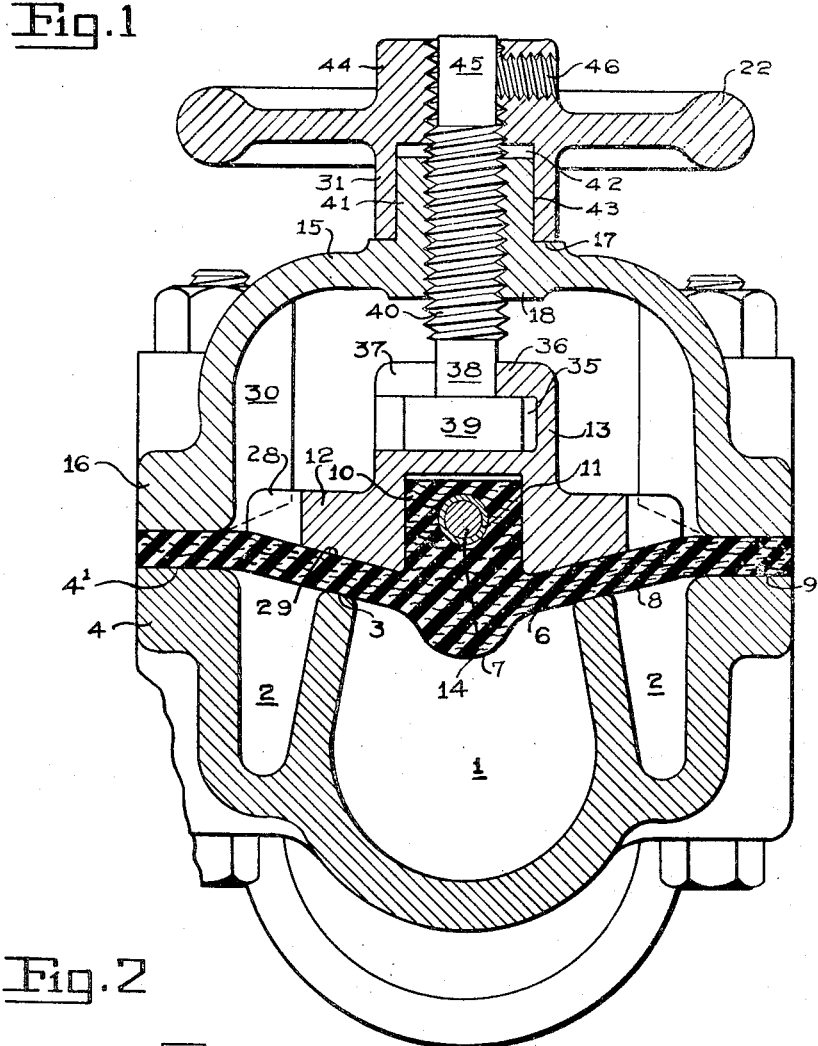
INVENTOR
OYSTEIN JACOBSEN
BY
Toulmin & Toulmin
ATTORNEYS Patented Feb. 6, 1951

2,540,371

UNITED STATES PATENT OFFICE 2,540,371

DIAPHRAGM VALVE

Oystein Jacobsen, Dayton, Ohio, assignor to The Duriron Company, Inc., Dayton, Ohio, a corporation of New York Original application January 27, 1944, Serial No. 519,859. Divided and this application July 6, 1945, Serial No. 603,523

2 Claims. (Cl. 251—24)

The present invention relates to valves of the type which employs an obturating member in the form of a flexible diaphragm to regulate the rate of flow of fluid through the valve.

This application is a division of my prior application Serial No. 519,859, filed January 27, 1944, entitled "Diaphragm Valve," and now abandoned.

The valve is usually positioned on top of the terminating portions of a pair of conduits arranged in line and in which one of the conduits terminates in an annularly shaped flange concentrically arranged within the terminating flange of the other conduit. The flexible diaphragm is contained in a valve bonnet and is secured to a valve stem through a backing member and which stem is adapted to reciprocate within the bonnet in order to open and close the valve. When the valve is in its open condition, the diaphragm is supported by the backing member, but when the valve is in closed condition the diaphragm is forced against the inner annular flange of the pipe body by a downward movement of the backing member. The diaphragm is usually composed of a rubberized fabric and it has been found that after repeated closing operations of the valve in which the diaphragm is brought hard against the annular flange of the conduits extreme wear may be caused to the diaphragm due to distortional and fracturing effects on the body of the diaphragm. It will be understood that the reciprocatory movements of the valve stem are usually obtained through a hand-wheel, and the latter is turned by the operator usually as far as it will go, which in effect squeezes the diaphragm against the annular flange of the pipe couplings.

The primary object of the invention is to provide structure by which undue squeezing effects are eliminated in order to increase the operating life of the diaphragm.

Another object is to limit the distance through which the valve stem and the diaphragm carried thereby may move in the valve-closing and valve-opening directions so as to regulate the strains and stresses to which the diaphragm is subjected during operation.

Still another object is to provide stops on the actuating member of the valve so as to control and regulate the distance through which the member moves when operated by a hand-wheel.

Another object is to provide structure by which the stop or stops on the actuating member may be adjusted so as to obtain a nicety of contact between the diaphragm and the pipe couplings in the valve-closed position and an equal absence of distortional or compressional effects on the diaphragm in the open-valve position.

The above objects are attained in brief by providing a so-called "rising wheel" type of valve, having a threaded surface between the hand-wheel and the stem by which to adjust the relative position between the stem and hand-wheel, and thereafter to locate the wheel on the stem by a set screw when nicety of contact has been established between the diaphragm and its seat in closed-valve position.

A problem which has arisen in the use of valves of the rising wheel type is that when the valve is opened by elevating the wheel, a space is often left between the hub portion of the wheel and the bonnet through which gases and liquid under pressure and which are being controlled by the valve can escape. In accordance with another object of my invention there is provided improved structure by which all escape passageways for the contained gas or liquid are maintained closed, even when the hand-wheel is moved upwardly away from the bonnet. This object is attained in brief by providing a skirt portion on the hand-wheel hub, which portion surrounds a corresponding boss or other projection on the bonnet and the length of the skirt portion and boss are such that they are always in contact with one another throughout the entire upward movement of the hand-wheel.

The invention will be better understood when reference is made to the following description and the accompanying drawings, in which:

Figure 1 is a transverse sectional view of the improved valve provided with a structure which prevents the escape of gas or liquid from the interior of the valve as the hand-wheel rises, and regardless of the position of the hand-wheel.

Figure 2 is a fragmentary sectional view of the upper portion of the valve shown in Figure 1, but in which the hand-wheel has been elevated to its upper limit and showing that even when in this position there can be no escape of fluid between the hand-wheel and the upper portion of the bonnet.

Reference characters 1 and 2 represent respectively inlet and outlet passageways through which the fluid is to be controlled by the improved form of valve. These passageways are brought together into a concentric arrangement in which the fluid passes through an inlet pipe into the passageway 1, then over the edge 3 into the passageway 2 which leads to the outgoing pipe or conduit. The diaphragm generally designated at 6, which is employed for opening and closing the valve, takes on a shape formed compositely of a central downwardly extending spherical portion 7 and a reversely extending portion 8, terminating at its peripheral edge in a flat annular portion 9. The diaphragm is considerably thickened at its center by an upwardly extending boss portion 10 which receives a metal tube extending horizontally thereof for securing the diaphragm to its backing member.

This backing member may comprise a relatively flat metal plate 12 extending radially along the upper surface of the diaphragm and provided with a centrally disposed hub portion 13 which has a round opening for snugly receiving the boss 10 of the diaphragm. A pair of aligned openings extend horizontally through the backing plate 12 for receiving a pin 14 which also passes through the tube 11. Thus, the pin 14 serves firmly but detachably to secure the diaphragm to the backing member 12.

The outer edge of the diaphragm 6 is held in position on the seat 4 by means of a bonnet 15 which is provided at its seat end with a peripherally enlarged portion 16. The outer and inner surfaces of the bonnet terminate in bosses 17, 18, which extend in opposite directions.

The plate 12 may take on a circular shape except at its outer or peripheral edge and a number of equidistantly spaced convolutions or scallops 28 may be provided. These scallops represent curvilinear recesses with projections rounded off in a semi-circular fashion. The configuration and dimensions of each scallop are such as to lend great strength to the projections and at the same time provide sufficient strength in the circumferential direction to accommodate strains that may be imposed upon the metal when the valve is subjected to high pressure fluids.

The bonnet 15 is provided at its inner surface and at equidistantly spaced positions about the surface with vertical lugs 30 which may be cast directly in the material of the bonnet. Thus, as the backing member is withdrawn from the uppermost position, the diaphragm is supported mainly by the slightly tapered front face of the backing member 12 and also by the lower tapered edges of the curvilinear lugs 30 leaving practically no area whatsoever on the diaphragm which remains entirely unsupported. On the other hand, when the backing member 12 is moved downwardly, the scallops of the backing member are permitted readily to slide within the recesses formed by the lugs 30 so that when the lower surface of the diaphragm contacts the upper edge 3 of the pipe conduits, the diaphragm is supported at its rear surface, not only by the lower continuous face of the backing member 12, but also by the lower edges of the scallops 28.

The hub on the backing member 12 is provided with a relatively wide groove which extends transversely of the hub and is open to the exterior of the hub from one side. This groove is so cut as to leave an overhanging flange 36 which is provided with a slot 37 extending to the exterior of the hub and arranged in line with the groove 35. This slot has a width slightly larger than the diameter of the stem portion 38 and the latter is provided with an enlarged portion 39 which fits snugly but slidably within the groove 35. The arrangement is such that the stem 38 and its enlarged portion 39 can slide into and be received by the grooves 37 and 35 respectively, and the overhanging portion 36 will prevent the stem from being withdrawn in the vertical direction away from the hub 13, but will permit the stem to be rotated with respect to the hub.

The stem 38 is threaded as indicated at 40 intermediate its length and this threaded portion engages threads in an upstanding cylindrical member 41 formed integral with the boss 17. The outside diameter of the member 41 is preferably machined and this machined surface receives the hub 31 of the hand wheel which has been counterbored to provide a skirt portion. The depth of the counterbore is somewhat greater than the height of the member 41 so as to leave a space indicated at 42 when the wheel is in a position closest to the bonnet. The length of the skirt portion 31 is such that its lower surface will contact the boss 17 in the lowest position of the hand wheel and is also such that the skirt portion will overlap the member 41 at the top when the wheel has been elevated to its upper limit. This last-mentioned condition is shown in Figure 2 and the overlap is indicated by the reference character 43.

The hand wheel is provided with an upwardly extending boss or hub 44 immediately surrounding the unthreaded portion 45 of the stem 38 and there is a centrally disposed bore extending through this hub portion which is threaded to receive the threaded portion 40 of the stem. A set screw 46 may extend transversely of the hub 44 to contact with the portion 45 of the stem when proper adjustment has been made between the hand wheel and the stem as will be explained presently.

It will be noted that the upper edge 3 of the inner pipe which formed the passageway 1 is slightly lower than the upper edge 4' which represents the outer pipe forming the passageway 2 so that the diaphragm 6 takes on a convex shape when the valve is in closed position. It is also evident that under these circumstances a squeezing effect is exercised on the diaphragm between the backing member 12 and the upper edge 3 so that if the shape of the diaphragm does not conform exactly to the shape of the backing member or to the shape of the edge 3, there is a tendency for the diaphragm to be torn or pulled out of shape at the various places.

The arrangement of parts and their adjustment are such that when the diaphragm 6 is forced downwardly so that it just makes contact with the surface 3, i. e., without undue compression, the lower surface of the skirt or hub member 31 is brought into contact with the boss 17. In other words, the latter serves to prevent any undue downward movement of the hand wheel 22 and as will be shown hereinafter prevents any undue downward movement of the stem 38 and any tearing at the diaphragm. It is apparent that these two conditions, namely the firm but not excessive pressure between the diaphragm and the conduit and also the contact between the skirt portion 31 and the bonnet can be readily obtained by simply rotating the hand wheel with respect to the stem, thus causing the stem to move longitudinally with respect to the hand wheel. When the proper adjustment has been obtained the set screw 46 is tightened so that any further movement of the hand wheel causes the stem to rotate on its threads with respect to the bonnet 15 thereby elevating the hand wheel and drawing the diaphragm 6 upwardly. It has been explained hereinbefore that the hub 13 of the backing plate is so designed as to permit rotation of the stem 38 with respect to the backing plate and thus to exert an upward pull on the flange 36. As the hand wheel 22 rises it is apparent that the skirt portion 31 moves upwardly with respect to the cylindrical projection 41. However, as shown in Figure 2 these parts are so dimensioned that there is always an overlap therebetween even when the upper surface of the flange 36 comes into contact with the boss 18 to determine the upper limit of movement of the stem. Consequently, there is no passageway present from the exterior to the interior of the valve or vice versa, past the lower surface of the skirt portion 31 by which contamination can enter the valve or the fluids passing through the conduits can leave the valve. Thus, the valve is completely fluid tight under all conditions and even when the hand wheel has been elevated to its uppermost limit.

The valve shown in Figure 1 therefore provides a structure by which whenever the hand wheel is turned in the valve closed direction as far as it will go, the operator is assured that no undue pressure is being exerted on the delicate diaphragm 6. There is therefore no tendency for any tearing or other damage to be sustained by the diaphragm when the valve is maintained in a closed position for considerable periods of time. Having made the proper adjustment the operating mechanism will always serve to limit the downward movement of the stem to any predetermined point of travel regardless of the force which may be exerted on the hand wheel. The upper movement of the stem 45 and the rising hand wheel 22 is limited by the fact that the upper surface of the flange 36 comes into contact with the hub 18. Thus, an effective stop is provided for both the upward and downward movement of the valve stem so that the amount of travel and flexing effect which the diaphragm undergoes in moving from its closed to its open position and vice versa is limited.

It will be understood that I desire to comprehend within my invention such modifications as come within the scope of the claims and the invention.

Having thus fully described my invention, what I claim as new and desire to secure by Letters Patent, is:

1. A valve for controlling the flow of liquid through a valve body having a valve seat, said valve including a diaphragm presented to said seat and a backing member contained within a bonnet, said bonnet having an upstanding projection provided with a threaded opening to receive a threaded stem which is secured to said backing member, a handwheel for rotating said stem, means for preventing rotation of said backing member and said diaphragm when the stem is rotated, said handwheel being provided with a downwardly extending skirt portion which slidably but sealingly surrounds the upstanding projection on the bonnet, the length of the skirt portion being such that when the handwheel has been turned to its valve-closed position, the skirt firmly and sealingly contacts the upper surface of the bonnet while maintaining sealing contact with said projection to prevent further movement of the diaphragm in the valve-closing direction and to prevent leakage between the contacting surfaces of the skirt portion and the bonnet.

2. A valve for controlling the flow of liquid through a valve body having a valve seat, said valve including a diaphragm presented to said seat and a backing member contained within a bonnet, said bonnet having an upstanding projection which extends from a shoulder on the bonnet, said projection being provided with a threaded opening to receive a threaded stem which is secured to said backing member, a handwheel for rotating said stem, means for preventing rotation of said backing member and said diaphragm when the stem is rotated, said handwheel being provided with a downwardly extending skirt portion which slidably but sealingly surrounds the upstanding projection on the bonnet, the length of the skirt portion being such that when the handwheel has been turned to its valve-closed position, the skirt firmly and sealingly contacts said shoulder on the bonnet while maintaining sealing contact with said projection to serve as a stop and to prevent leakage between the contacting surfaces of the skirt portion and the bonnet during operation of the valve, said backing member having a hub portion which extends upwardly toward the inner surface of the bonnet and adapted to contact the bonnet surface opposite from said shoulder to serve as a stop in the valve-open position.

OYSTEIN JACOBSEN.

REFERENCES CITED

The following references are of record in the file of this patent:

UNITED STATES PATENTS

| Number | Name | Date |
|---|---|---|
| 685,396 | Dexter | Oct. 29, 1901 |
| 774,985 | Jones | Nov. 15, 1904 |
| 1,121,825 | Gray | Dec. 22, 1914 |
| 1,227,459 | Liddle | May 22, 1917 |
| 1,800,157 | Saunders | Apr. 7, 1931 |
| 1,992,043 | Saunders | Feb. 19, 1935 |

FOREIGN PATENTS

| Number | Country | Date |
|---|---|---|
| 104,400 | Great Britain | of 1917 |